US006034005A

United States Patent [19]
Diehl

[11] Patent Number: 6,034,005
[45] Date of Patent: Mar. 7, 2000

[54] NONWOVEN FABRIC OF NON-CELLULOSE FIBERS AND A METHOD OF MANUFACTURE

[75] Inventor: David F. Diehl, Akron, Ohio

[73] Assignee: OMNOVA Solutions Inc., Fairlawn, Ohio

[21] Appl. No.: 08/945,544

[22] PCT Filed: Apr. 18, 1996

[86] PCT No.: PCT/US96/05356

§ 371 Date: Oct. 22, 1997

§ 102(e) Date: Oct. 22, 1997

[87] PCT Pub. No.: WO96/33867

PCT Pub. Date: Oct. 31, 1996

[51] Int. Cl.[7] .................................................. B32B 27/34
[52] U.S. Cl. .................... 442/164; 442/104; 442/131; 442/136; 442/167; 442/170; 442/171; 442/327
[58] Field of Search .................................. 442/104, 131, 442/136, 164, 167, 170, 171, 327

[56] References Cited

U.S. PATENT DOCUMENTS

| | | | |
|---|---|---|---|
| 4,529,787 | 7/1985 | Schmidt et al. | 526/317 |
| 4,546,160 | 10/1985 | Brand et al. | 526/320 |
| 4,613,650 | 9/1986 | Sekiya et al. | 524/828 |
| 5,021,529 | 6/1991 | Garrett | 526/304 |
| 5,028,655 | 7/1991 | Stack | 524/522 |
| 5,302,446 | 4/1994 | Horn | 428/286 |
| 5,326,853 | 7/1994 | Hayes | 524/813 |

*Primary Examiner*—Helen L. Pezzuto
*Attorney, Agent, or Firm*—Robert F. Rywalski; Larry R. Meenan

[57] ABSTRACT

A nonwoven fabric of chemically bonded non-cellulose fibers including a random arrangement of non-cellulose fibers and an essentially formaldehyde free latex binder capable of developing maximum tensile properties at temperatures less than the melt bonding temperature of the non-cellulose fibers.

32 Claims, 1 Drawing Sheet

NONWOVEN FABRIC OF NON-CELLULOSE FIBERS AND A METHOD OF MANUFACTURE

FIELD OF THE INVENTION

The present invention relates to a nonwoven fabric of chemically bonded non-cellulose fibers. More particularly, the present invention relates to a nonwoven fabric including a random arrangement of non-cellulose fibers and an essentially formaldehyde free latex binder capable of developing maximum tensile properties at temperatures less than the melt bonding temperature of the non-cellulose fibers, of significance polypropylene and polyethylene.

BACKGROUND OF THE INVENTION

A nonwoven fabric is a preformed web or mat of fibers laid down mechanically. The fibers may be deposited in a random manner or oriented primarily in one direction. Most widely used fibers include cellulosics, polyamides, polyesters, polypropylene and polyethylene. The spun fibers, which may be drawn, are laid down directly onto a porous belt by carding, air-laying or wet-laying. The sheet is then bonded together with a binder subsequently treated in an oven or a calendar to complete the bonding process.

A number of methods have been developed for applying a binder to randomly-dispersed fibers. Typically, a water based emulsion binder system is used in which a thermoplastic or thermoset synthetic polymer latex is prepared and a loose preformed web of fibers to be treated is immersed therein, saturated or sprayed using special equipment in view of the structural weakness of the preformed web; the thus treated preformed web is dried and cured to effect proper bonding. Alternatively, an aqueous or solvent solution binder system of a thermoplastic or thermoset resin may be used to impregnate the fibrous preformed web.

Still other methods include the application of thermoplastic or thermoset resin powders to the fibers, before or after making a preformed web of the same, and passing the preformed web through hot rolls or a hot press to bind the fibers together. Alternatively, thermoplastic fibers having a softening point below that of the base fibers may be interdispersed in a preformed web of the latter and sufficient heat and pressure applied, such as by the use of heated rolls, to soften the thermoplastic fibers and bind the fiber network together.

Commonly used latices for non-woven fabrics are those prepared from polymers of butadiene-styrene, butadiene-acrylonitrile, vinyl acetate, acrylic monomers such as methyl acrylate, ethyl acrylate, methyl methacrylate and the like. While the emulsion binder system is the most popular method of forming non-woven fabrics, the homopolymers, copolymers and terpolymers heretofore used therein have suffered from one or more disadvantages. To be useful as a textile material, the synthetic polymer must possess several physical properties. The desired properties include adequate tensile strength over a fairly wide temperature range, a high modulus or stiffness under certain conditions, and good textile qualities such as tenacity, handle and drape.

Initially, the use of styrene/butadiene latices in nonwovens has generally been restricted to disposable applications because of their tendency to discolor and embrittle upon exposure to long periods of heat, light and gas. Moreover, it will be appreciated that it has been an accepted practice to use self crosslinking or melamine formaldehyde resin posted latices to give improved wet and solvent tensiles to a nonwoven non-cellulose product. These systems, however, contain and liberate formaldehyde during the dry/cure cycle. In addition, essentially all commercial self crosslinking and melamine posted latices require a temperature of at least 280° F. and preferably 300° F. for proper crosslinking. However, it will be appreciated that because the melting point of some non-cellulose fibers is below the temperature required for proper crosslinking, e.g., polypropylene is around 250° F., conventional latices cannot be used. Accordingly, nonmelt bonded polypropylene fiber in the nonwoven industry has never enjoyed large success. The problem has been in the specific development of a suitable latex binder to give acceptable tensile properties.

The nonwovens in accordance with the present invention chemically bond at temperatures below the melt bonding point of the non-cellulose fibers. Accordingly, the nonwovens in accordance with the present invention provide reduced energy costs for nonwoven manufacturers due to lower temperature requirements and the ability to chemically bond the fibers. It is an object of the present invention to provide a nonwoven fabric of chemically bonded non-cellulose fibers. Another object of the present invention is to provide a nonwoven fabric including a random arrangement of non-cellulose fibers and an essentially formaldehyde free latex binder capable of developing maximum tensile properties at temperatures less than the melt bonding temperature of the non-cellulose fibers. It is another object of the present invention to provide a nonwoven fabric of chemically bonded non-cellulose fibers that is simple and economical to manufacture.

SUMMARY OF THE INVENTION

Briefly, according to this invention there is provided a nonwoven fabric including a random arrangement of non-cellulose fibers and an essentially formaldehyde free latex binder. The latex binder is capable of developing maximum tensile properties at temperatures of no more than about 225 degrees fahrenheit to chemically bond the non-cellulose fibers and form a dimensionally stable non-woven fabric. Suitable non-cellulose fibers include glass fibers or fibers made from high polymers. The high polymers include polyolefins, polyesters, and acrylics, polyamides and the like. The polyolefin fibers include polypropylene, polyethylene, polybutene and their copolymers. The polyester fibers include any long chain synthetic polymer composed of at least 85% by weight of an ester of a dihydric alcohol and terephthalic acid such as polyethylene terephthalate, and, in addition liquid crystal polyesters and the like. The acrylic fibers include any fiber forming substance containing a long chain synthetic polymer composed of at least 85% by weight acrylonitrile units —$CH_2CH(CN)$—. It will be appreciated that other types of non-cellulose fibers may also be employed in accordance with the teachings of the present invention. For example, high modulus fibers more commonly known as graphite fibers made from polyacrylonitrile or petroleum pitch may also be used.

The nonwoven fabric of non-cellulose fibers is formed by providing a random arrangement of non-cellulose fibers. Next, an essentially formaldehyde free latex binder capable of developing maximum tensile properties at temperatures of no more than about 225 degrees fahrenheit is applied to the fibers. Then the latex binder is heat treated to chemically bond the non-cellulose fibers to form a dimensionally stable nonwoven fabric.

The latex binder in accordance with the present invention is an essentially formaldehyde free latex binder prepared by emulsion polymerization of an emulsion polymerizable mixture. The emulsion polymerizable mixture includes ethylenically unsaturated monomers, a polymeric surfactant in an amount of from about 10 to about 50 wt % and a chain transfer agent in an amount of from about 0.1 to about 2 wt %. The ethylenically unsaturated monomers include at least one conjugated diene monomer and at least one vinyl substituted aromatic monomer. In a preferred embodiment, the ethylenically unsaturated monomers consist essentially of about 90 to about 30 wt % conjugated diene monomer and about 10 to about 70 wt % vinyl substituted aromatic monomer. The latex binder has a gel content of less than about 10 wt % and is capable of developing maximum tensile properties in the nonwoven fabric at temperatures less than about 225 degrees fahrenheit.

BRIEF DESCRIPTION OF THE DRAWINGS

Further features and other objects of the invention will become clear from the following detailed description made with reference to the drawings in which.

DETAILED DESCRIPTION OF THE PREFERRED EMBODIMENTS

Figure 1:
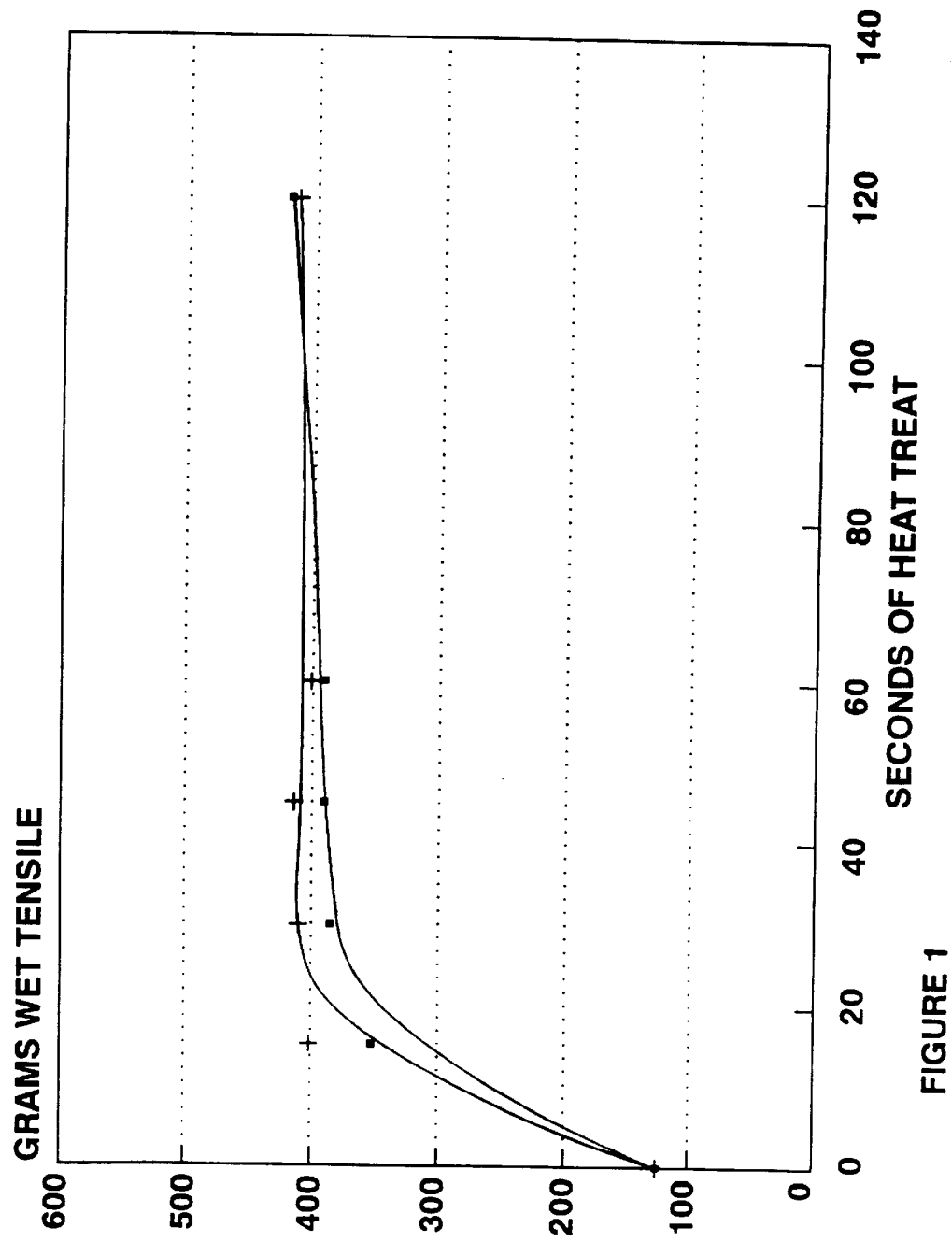
FIG. 1 is plot of wet tensile development of a latex binder versus the mat time exposed on a metal surface heated to 225° F.

The present invention relates to a nonwoven fabric of chemically bonded non-cellulose fibers. The fabric may be used for soft and drapable fabrics such as diapers, feminine hygiene cover stock, medical gowns, masks, caps and drapes, and for stiff and resilient fabrics such as apparel interliners, furniture skirting, quilts, water bed baffles and clothing insulation and padding.

The fabric of the present invention is made by forming a mat of randomly arranged non-cellulose fibers which are chemically bonded by an essentially formaldehyde free latex binder. The essentially formaldehyde free latex binder is capable of developing maximum tensile properties at temperatures less than the melt bonding point of the fibers to chemically bond the non-cellulose fibers and form a dimensionally stable nonwoven fabric. As well known in the art the latex binder may be applied to the layer of randomly arranged non-cellulose fibers in a spaced, intermittent pattern of binder sites, or uniformly applied throughout the layer of non-cellulose fibers.

As used herein the term "essentially formaldehyde free" refers to a latex binder which does not liberate more than 0.7 (PPM) parts formaldehyde per million parts of latex binder during the conventional dry/cure cycle of the latex binder as determined by Nash/HPLC (high performance liquid chromatography) as well known in the art and the term "chemically bonded" as used herein refers to a bond that is not formed as a result of a heat treatment, for example, as by melt bonding as evidenced by a physical change in the fibers.

The non-cellulose fibers of the fabric may be glass fibers or fibers made from high polymers. The glass fibers are of a type well known in the art and manufactured of molten glass extruded through small orifices and then spun at high speeds. Suitable high polymers include polyolefins, polyesters, and acrylics, polyamides and the like. The polyolefin fibers include polypropylene, polyethylene, polybutene and their copolymers. The polyester fibers include any long chain synthetic polymer composed of at least 85% by weight of an ester of a dihydric alcohol and terephthalic acid such as polyethylene terephthalate, and, in addition liquid crystal polyesters and the like. The acrylic fibers include any fiber forming substance containing a long chain synthetic polymer composed of at least 85% by weight acrylonitrile units —$CH_2CH(CN)$—. It will be appreciated that other types of non-cellulose fibers may also be employed in accordance with the teachings of the present invention. For example, high modulus fibers more commonly known as graphite fibers made from polyacrylonitrile or petroleum pitch may also be used.

The non-cellulose fibers may be of most any suitable size and randomly arranged to most any suitable thickness depending upon the desired end use of the nonwoven fabric. The non-cellulose fibers are typically of a length of about 0.25 to about 2 inches and typically about 1.2 to about 6 denier. The non-cellulose fibers may be laid in an overlapping, intersecting random arrangement to form a mat of non-cellulose fibers. The non-cellulose fibers may be arranged by most any convenient known manner such as by wet laying, air-laying or carding.

After the non-cellulose fibers are randomly arranged as desired, a latex binder is applied to the fibers. The latex binder is an essentially formaldehyde free latex binder capable of developing maximum tensile properties at a temperature of no more than about 225° fahrenheit, i.e., below the melt bonding point of the non-cellulose fibers. The latex binder of the present invention contains a controlled gel content of less than about 10 wt % and preferably less than about 6 wt % and a monomodal particle size of between about 600 Å to about 1200 Å, and preferably between about 600 Å to about 900 Å. The particle size of the latex binder may be determined by means of simple light transmission methods or capillary hydrodynamic fractioning (CHDF) as well known in the art.

The latex binder is employed in an effective amount which will result in the resulting fabric having sufficient strength and cohesiveness for the intended end use application. It will be appreciated that the exact amount of the latex binder employed depends, in part, upon factors such as the type of fiber, weight of fibrous layer, nature of latex binder and the like. For example, end uses which require a stronger fabric may utilize more binder. A typical content of latex binder applied on a non-cellulose fiber mat is about 15 to about 40 wt %. It is preferred that the minimum amount of latex binder be applied to obtain the minimum desired required physical properties of the nonwoven fabric such as tensile, hand and the like as well known in the art.

The latex binder utilized in accordance with the present invention may be prepared by well-known conventional emulsion polymerization techniques using one or more ethylenically unsaturated monomers and a polymeric surfactant as herein disclosed and additional conventional additives such as free-radical initiators, optional chain transfer agents, various emulsifiers (such as anionic or nonionic surfactants), chelating agents and the like can be utilized as set forth in U.S. Pat. No. 5,166,259 to Schmeing and White, incorporated herein by reference.

Suitable ethylenically unsaturated monomers in the emulsion polymerization reaction include conjugated diene monomers and vinyl substituted aromatic monomers. The conjugated diene monomers generally contain 4 to 10 carbon atoms, and preferably 4 to 6 carbon atoms. Examples of specific conjugated diene monomers include piperylene, isoprene, 2,3-dimethyl-1,3-butadiene, and the like, and preferably 1,3-butadiene, and most preferably a mix of cis-trans butadiene. The amount of conjugated diene monomers utilized is from about 90 to about 30 wt %, preferably from about 75 to about 45 wt %, and most preferably about 60 wt % of the total amount of reactive monomers. The vinyl substituted aromatic monomers generally contain 8 to 12 total carbon atoms. Examples of specific vinyl substituted aromatic monomers include α-methyl styrene, p-tertiary butyl styrene, m-vinyl toluene, p-vinyl toluene, 3-ethyl styrene, and the like, and preferably styrene. The amount of vinyl substituted aromatic monomers utilized is from about 10 to about 70 wt %, preferably from about 25 to about 55 wt %, and most preferably about 40 wt % of the total amount of reactive monomers.

The polymeric surfactant is an acrylic resin neutralized in solution. In a preferred embodiment the polymeric surfactant is a resin containing about 25 to about 27 wt % styrene/acrylic acid/α-methyl styrene copolymer in water neutralized with a base such as ammonium hydroxide, potassium hydroxide calcium hydroxide and the like and having an acid value of about 100 to about 300 and a weight average molecular weight greater than about 7,000. Most preferably, the polymeric surfactant is neutralized with about 6 to about 7 wt % ammonium hydroxide and has an acid value of about 205 and a weight average molecular weight of about 8,500 and an average weight ratio of monomers in parts by weight of about 37:32:31 of α-methyl styrene, styrene and acrylic acid.

The resin is prepared in accordance with the process described in U.S. Pat. No. 4,529,787 to Schmidt et al., incorporated herein by reference, using a minor amount of diethylene glycol monoethyl ether as a solvent. Additional resins useful in accordance with the present invention may be made in accordance with the teachings of U.S. Pat. Nos. 4,414,370 to Hamielec et al. and U.S. Pat. No. 4,546,160 to Brandt et al., incorporated herein by reference.

The amount of polymeric surfactant utilized is from about 10 to about 50, preferably from about 15 to about 35, and most preferably about 30 wt % of the total amount of reactive monomers on a dry latex basis.

The free-radical initiators utilized to polymerize the various above latex binder forming monomers include sodium persulfate, ammonium persulfate, potassium persulfate and the like. Other free radical initiators can be used which decompose or become active at the temperature utilized during polymerization such as various peroxides, e.g., cumene hydroperoxide, dibenzoyl peroxide, diacetyl peroxide, The chain transfer agent can generally be any suitable chain transfer agent well known in the art. Suitable chain transfer agents include mercaptans such as the alkyl and/or aryl mercaptans having from 8 to about 18 carbon atoms and preferably from about 12 to about 14 carbon atoms. The tertiary alkyl mercaptans having from 12 to 14 carbon atoms are highly preferred. Examples of suitable mercaptans include n-octyl mercaptan, n-dodecyl mercaptan, t-octyl mercaptan, t-dodecyl mercaptan, tridecyl mercaptan, tetradecyl mercaptan, hexadecyl mercaptan, and the like as well as combinations thereof. The amount of the chain transfer agent is generally from about 0.2 to about 2 parts per hundred parts monomer, preferably about 0.4 to about 0.9 parts per hundred parts monomer, more preferably about 0.7 parts per hundred parts monomer. In a preferred embodiment, the chain transfer agent is a dodecyl mercaptan chain transfer agent such as Sulfole 120 commercially available from Phillips 66 Co.

Chelating agents may also be used during polymerization to tie up various metal impurities as well as to achieve a uniform polymerization. The amount of such chelating agents is generally small, such as from about 0.02 to about 0.08, and preferably about 0.05 parts chelating agent per hundred parts total monomer. Examples of suitable chelating agents include ethylene diamine tetraacetic acid, nitrilotriacetic acid, citric acid and their ammonium, potassium and sodium salts. Preferred chelating agents include those chelating agents commercially available under the name Hamp-ene from Hampshire Chemical.

The gel content of the latex binder is determined as the weight percentage fraction of dried polymer to total polymer that is insoluble in tetrahydrofuran at 68° F. after 8 hours immersion.

The gel content was determined using a modified version of a Baker Cell test commonly used in the styrene-butadiene latex industry. The modified version of the Baker Cell test involved weighing about 0.225±0.001 grams of the latex to the nearest 0.1 milligram and placing the latex in a flask containing tetrahydrofuran. The flask was then stirred for eight hours and then the content of the flask was filtered through a #4 Whatman filter paper from Whatman International Limited. The #4 Whatman Filter Paper has a particle retention of greater than about $20\mu$ to about $25\mu$. Next, 25 ml. of the filtered solution was poured from the flask to a separate container and then evaporated. The residue remaining after evaporation was then weighed. The residue remaining represents the soluble polymer in 25 ml. of filtered solution. Based upon the amount of soluble polymer the amount of insoluble polymer or gel may be determined. It has been found that this technique provides a gel measurement within about +2 percent of the conventional Baker Cell test commonly used to determine gel content.

The gel content is an indication of the extent of cross-linking present between polymer chains in the final structure of the latex binder. A low gel content indicates reduced cross-linking, a lower molecular weight polymer and a lower glass transition temperature (Tg) which facilitates, it is believed, a low cure temperature for the latex binder, e.g., capable of developing maximum tensile properties at temperatures less than about 225 degrees fahrenheit. It is believed that an additional benefit of a low gel content latex binder is improved film formation and wetting of the non-cellulose fibers.

In a preferred embodiment, the polymerization of the ethylenically unsaturated monomers and polymeric surfactant occurs sequentially. The following examples are illustrative of the sequential addition of the ethylenically unsaturated monomers and polymeric surfactant to form the latex binder.

EXAMPLE

Initially, a charge of deionized water, polymeric surfactant and Hamp-ene were added to a reactor having a volume of about 20 gallons and having a capacity to hold about 140 lb. of latex. After addition of the polymeric surfactant the reactor was then evacuated with a vacuum (about 20 inches of mercury), purged with nitrogen and heated to a desired temperature. Ammonium persulfate was then added to the reactor as about a 10% solution in deionized water.

A charge comprising styrene, butadiene and dodecyl mercaptan was then charged to the reactor sequentially in equal batches. Provided in Table 1 is an example of a charge comprising styrene, butadiene and dodecyl mercaptan which was added to the reactor.

TABLE 1

| Charge | Weight percent |
|---|---|
| styrene | 39.7 |
| butadiene | 59.6 |
| dodecyl mercaptan | 0.7 |

The first batch was charged to the reactor approximately 5 minutes after the ammonium persulfate was added. Additional batches were then charged to the reactor at staged intervals of about 15 or 20 minutes. The batches may be added over most any suitable number of staged intervals depending upon the amount of latex binder to be polymerized. For example, the batches may be added in equal increments from 6 stages up to 12 or more stages. After the last batch was added to the reactor the reaction was monitored until the solid level of the latex in the reactor indicated an acceptable conversion level. In instances where the rate of reaction during the hold was undesirably slow an additional amount of ammonium persulfate was charged.

After the desired conversion level was reached, the latex was placed in a 60 gallon vessel and steam and vacuum stripped. This procedure included the addition of a defoamer such as Drew L198. The preservative Kathon LX was also added along with the anti-oxidant Bostex 362-C supplied by Akron Dispersion Inc. as well known in the art. Bostex 362-C is an aqueous mixture of ditridecyl thiodipropionate, 4-methyl phenol and reaction product of dicyclopentadiene and isobutylene, sodium dodecylbenzene sulfonate.

Representative physical properties of the preferred styrene-butadiene latex binder are shown in Table 2.

TABLE 2

| Solids, % by weight | 46.0 ± 1.0 |
|---|---|
| Wet weight/gallon, lbs. | 8.4 |
| Brookfield viscosity, cps | 100–300 |
| pH | 7.6 |
| Surface Tension, dynes/cm | 45.0 |
| Glass transition temperature, ° C. measured (DSC[1]) | −35 |
| Particle charge | anionic |
| Particle size, Å | 600–900 |

[1]Differential Scanning Calorimetry

The measured glass transition temperature (Tg) of the latex binder is approximately equal to the glass transition temperature of the latex binder when calculated by a weight fraction method. The glass transition temperature when calculated by a weight fraction method for a styrene/butadiene ratio of 40/60 is as follows:

$$1/Tg = W_{STY}/Tg_{STY} + W_{BD}/Tg_{BD}$$

wherein;

$W_{STY}$ = weight fraction of styrene $W_{BD}$ = weight fraction of butadiene $Tg_{STY}$ = glass transition temperature of polystyrene $Tg_{BD}$ = glass transition temperature of polybutadiene $$1/Tg = 0.4/373K + 0.6/188K$$

$$Tg = 235K + -38° C.$$

The glass transition temperature value of a mix of cis-trans polybutadiene measured by DSC is 193±2.

$$1/Tg = 0.4/373K + 0.6/193K$$

$$Tg = 239K = -34° C.$$

The resulting latex binder was then applied to selected nonwoven non-cellulose fibers of a type as previously described using most any suitable method well known in the art such as saturation, immersion or spraying. Reference is made to the nonwoven fabric industry literature generally for detailed descriptions on the various apparatus and processing structures and conditions for applying a latex binder to fibers to form a fabric.

After applying the latex binder to the nonwoven non-cellulose fibers the latex binder was air dried and then heat treated to bond the non-cellulose fibers and form a dimensionally stable nonwoven fabric. It will be appreciated that the latex binder may also be dried by passing it over the surface of a plurality of steam heated cans or through a heating tunnel or oven which may use circulating hot air or infrared lamps to dry the latex binder. The drying time will be a function of a number of factors such as the heat capacity of the non-cellulose fibers, the type of heating, the oven temperature, air velocities (if circulating air is used), and the rate of passage of the non-cellulose fibers through the oven or heating tunnel. For example, the latex binder may be heat treated by heating and drying the fibers at a temperature of about 225° F. (fahrenheit) for approximately 60 seconds.

As shown in FIG. 1, the latex binder bonds and develops maximum tensile properties on a nonwoven non-cellulose polyester fabric at a temperature less than 230° F. The heat treat rate is determined by plotting wet tensile development of a latex binder versus the mat time exposed on a metal surface heated to 225° F. (Table 3).

TABLE 3

| Mat time exposed (sec) | Example 1 Latex Binder Wet Tensile (grams) | Example 2 latex Binder Wet Tensile (grams) |
|---|---|---|
| charge (wt %) | | |
| styrene | 39.7 | 39.7 |
| butadiene | 59.6 | 59.6 |
| dodecyl mercaptan | 0.7 | 0.7 |
| 0 | 120 | 121 |
| 15 | 354 | 401 |
| 30 | 384 | 411 |
| 45 | 390 | 417 |
| 60 | 391 | 402 |
| 120 | 422 | 417 |

In accordance with the present invention, bonding and maximum tensile development on non-cellulose fibers, such as polyesters, polyolefins, glass fibers and acrylic nonwovens, occurs well below their melt bonding points, i.e., up to the temperature at which a physical change occurs in the fiber structure. Accordingly, a latex binder having a heat treat temperature less than the melt bonding point of the fiber may now be used for the chemical bonding of fibers that would have melted at temperatures previously required for the curing of conventional self crosslinking and melamine formaldehyde resin containing systems. Conventional self crosslinking and melamine formaldehyde resins with latices were typically used to give improved wet and dry tensile properties to a nonwoven product. These systems, however, contain and liberate formaldehyde during the dry/cure cycle.

In addition to developing maximum tensile properties at temperatures below the melt bonding temperature of the nonwoven, non-cellulose fibers, the fabrics in accordance with the present invention exhibited performance properties as shown in Tables 3–6.

All of the reported performance properties were determined after conditioning the fibers in accordance with the present invention for about 24 hours at TAPPI (Technical Association of the Pulp and Paper Industry) Standard Conditions of approximately 72° F. and about 50% relative humidity. The tensile values, both dry and wet, were determined in accordance with ASTM D 1117-80 entitled "Standard Methods of Testing Nonwoven Fabrics" published in the 1980 Annual Book of ASTM Standards. Following the ASTM standard test method, dry tensile measurements were determined by using 1 inch wide and 4 inch long strips of fabric pulled at a rate of 5 inches per minute at an initial jaw separation of about 3 inches on an Instron. The wet tensile measurements were determined in substantially the same manner as the dry tensile measurements except the fabric strip was soaked in water solution for about 30 seconds prior to testing on the Instron. The Hand Values are a quantitative measure of the fabric as well known in the textile industry. The Hand Values reported are an average value of the readings determined on a Thwing Albert Handle-O-Meter by using a 5 inch square piece of the fabric. The fabric was tested on the Handle-O-Meter in both the Machine and Cross machine directions. The amount of latex binder was calculated as follows. The weight of the fiber (F) was obtained before applying the latex binder (L). After applying the latex binder (L), the fiber was allowed to air dry and the final weight of the fabric was obtained (F+L). The latex binder content reported below was then determined in accordance with the equation L/(F+L)×100. The basis weight of each of the neat fiber of a particular fiber (Tables 4, 5, 6 and 7) was maintained constant. Sample squares approximately 10 inches by 10 inches were cut and sorted into weight ranges having only a 0.1 gram variance per 100 square inches within a particular Table.

TABLE 4

| EXAMPLE | 1 | 2 | 3 |
|---|---|---|---|
| Dry | 5 min @ 250 F. | 5 min @ 250 F. | 5 min @ 250 F. |
| Heat treat | 1 min. @ 300 F. | 1 min. @ 300 F. | 1 min. @ 300 F. |
| Amount of Latex Binder | | | |
| charge (wt %) | 37.3 | 35.5 | 34.3 |
| styrene | 39.8 | 59.6 | 19.9 |
| butadiene | 59.5 | 39.8 | 79.4 |
| dodecyl mercaptan | 0.7 | 0.7 | 0.7 |
| Fiber | Polyester | Polyester | Polyester |
| denier | 1.2 | 1.2 | 1.2 |
| fiber length | 1.5 in. | 1.5 in. | 1.5 in. |
| Hand Value (grams) Cross-Direction Dry Test | 36.7 | 44.4 | 42.6 |
| tensile (grams) | 605.6 | 582.5 | 282.4 |
| % elongation to break | 43.5 | 28.4 | 13.0 |
| Wet Test- | water | water | water |
| tensile (grams) | 481.5 | 468.0 | 257.3 |
| % elongation to break | 40.8 | 28.1 | 19.6 |
| Wet Test- | mineral spirits | mineral spirits | mineral spirits |
| tensile (grams) | 122.8 | 127.4 | 87.2 |
| % elongation to break | 7.4 | 4.9 | 3.8 |

TABLE 5

| EXAMPLE | 1 | 2 |
|---|---|---|
| Dry | air dry | air dry |
| Heat treat | 2 min @ 225 F. | 2 min @ 225 F. |
| Post addition Aerosol 22 | 1.0 | 1.0 |
| Amount of Latex Binder | | |
| charge (wt %) | 36.9 | 37.1 |
| styrene | 39.8 | 59.6 |
| butadiene | 59.5 | 39.7 |

TABLE 5-continued

| EXAMPLE | 1 | 2 |
|---|---|---|
| dodecyl mercaptan | 0.7 | 0.6 |
| Fiber | polypropylene | polypropylene |
| denier | 1.8 | 1.8 |
| fiber length | 1.5 in. | 1.5 in. |
| Hand Value (grams) Cross-Direction Dry Test | 6.5 | 7.4 |
| tensile (grams) | 281.3 | 296.0 |
| % elongation to break | 78.0 | 51.8 |
| Wet Test-0.5% Aerosol OT | | |
| tensile (grams) | 161.2 | 189.6 |
| % elongation to break | 27.8 | 25.4 |
| Wet Test-perchloroethylene | | |
| tensile (grams) | 4.9 | 8.5 |
| % elongation to break | NA | NA |

TABLE 6

| EXAMPLE | 1 | 2 |
|---|---|---|
| Dry | air dry | air dry |
| Heat treat | 1 min. @ 250 F. | 1 min. @ 250 F. |
| Amount of Latex Binder | | |
| charge (wt %) | 38.5 | 38.3 |
| styrene | 39.7 | 39.7 |
| butadiene | 59.5 | 59.5 |
| dodecyl mercaptan | 0.7 | 0.7 |
| Fiber | Acrylic | Acrylic |
| denier | 1.2 | 1.2 |
| fiber length | 2.0 in. | 2.0 in. |
| Hand Value (grams) Cross-Direction Dry Test | 70.4 | 54.8 |
| tensile (grams) | 1015.0 | 979.0 |
| % elongation to break | 34.5 | 33.7 |
| Wet Test-0.5% Aerosol OT | | |
| tensile (grams) | 755.6 | 716.2 |
| % elongation to break | 24.8 | 24.7 |

TABLE 7

| EXAMPLE | 1 | 2 |
|---|---|---|
| Dry | air dry | air dry |
| Heat treat | 1 min @ 225 F. | 1 min @ 225 F. |
| Amount of Latex Binder | | |
| charge (wt %) | 24.6 | 24.1 |
| styrene | 39.7 | 39.7 |
| butadiene | 595 | 595 |
| dodecyl mercaptan | 0.7 | 0.7 |
| Fiber | Polyethylene | Polyethylene |
| denier | 3.0 | 3.0 |
| fiber length | 1.5 in. | 1.5 in. |
| Hand Value (grams) Cross-Direction Dry Test | 16.9 | 19.8 |
| tensile (grams) | 127.8 | 127.0 |
| % elongation to break | 93.7 | 79.7 |
| Wet Test-0.5% Aerosol OT | | |
| tensile (grams) | 94.2 | 89.7 |
| % elongation to break | 32.7 | 16.2 |

Tables 4–7 illustrate the performance of various nonwoven, non-cellulose fabrics having applied thereto a latex binder as previously described. The nonwoven, non-cellulose fabrics exhibit acceptable tensile properties without requiring a melamine formaldehyde resin as an additive in the latex binder to increase tensile properties. It will be appreciated that melamine formaldehyde resins are often difficult to mix with the latex binder, require a fairly high temperature to cure, and contribute formaldehyde to the workplace and to the end use product. As illustrated in Tables 4–7, acceptable tensile properties are obtained in accordance with the present invention for polyester fibers, acrylic fibers, polypropylene fibers and polyethylene fibers. It is believed that similar comparisons are obtainable on other fibers such as glass fibers, polyamide fibers and the like.

It will be appreciated that both the required temperature for cure and the rate of cure at a given temperature are important for tensile development in a nonwoven product. Conventional self crosslinking and melamine formaldehyde resin containing latices require fairly high temperatures for complete cure. Higher cure temperatures require more energy and lower line speeds. Accordingly, a lower processing temperature facilitates increased productivity and higher cost savings. In the nonwoven area, whether the latex binder is typically applied by saturation or by spray, the limiting factor in line speed is the drying and curing of the latex binder. Reduced processing temperatures have always been desired in terms of reduced energy requirements. Several latices in the nonwoven area are either self-crosslinking or contain a melamine formaldehyde resin to increase tensile properties to a desired level. The temperature to activate the self crosslinking mechanism or the melamine formaldehyde resin reaction is the same and is approximately 280° F. Cure cans and ovens are typically set at 330° F. in order to obtain a preformed web temperature of 300° F. for proper cure. A typical cure of a self crosslinking latex develops maximum tensiles at 300° F. usually in 40–50 seconds.

With reducing temperatures, the heat treat rate slows down to the point of obtaining tensiles below a fully cured melamine formaldehyde resin addition. It will be appreciated that at temperatures of 225° F. little or no cross linking occurs. However, a nonwoven in accordance with the present invention obtains acceptable tensiles in about 30 to about 40 seconds, and as low as 15 seconds and at a temperature as low as 225° F.

In addition to improved tensile properties of the nonwoven, non-cellulose fabric, the fabric also exhibited improved resistance to heat, light and gas exposure thereby providing a more durable fabric. The improved resistance to heat, light and gas exposure of the latex binder was evidenced by the addition of an anti-oxidant of a type as previously described to the emulsion shortly after polymerization. In a preferred embodiment about 0.1 to about 3 parts anti-oxidant may be added to the dry latex, most preferably about 0.5 to about 1.5 parts.

As shown in Table 8, a latex binder of a type described herein was prepared and separated into two separate batches. An anti-oxidant was added to only one of the latex binder batches. Free films of the latex binders were tested in accordance with ASTM D 1925-70 entitled "Standard Method of Test for Yellowness Index Of Plastics" published in the 1970 Annual Book of ASTM Standards.

TABLE 8

| | Latex Binder w/o Anti-oxidant | Latex Binder w/ Anti-oxidant (1 part/100 part dry latex) |
|---|---|---|
| before exposure | 5.4 | 5.3 |
| FADE-O-METER (exposed to a carbon arc lamp) | | |
| 20 hrs | 7.3 | 5.8 |
| 40 hrs | 11.7 | 5.1 |
| 60 hrs | 16.4 | 6.7 |
| 80 hrs | 17.8 | 6.1 |
| HEAT AGE (exposed to a temperature or 200° F.) | | |
| 8 hrs | 13.7 | 7.2 |
| 16 hrs | 28.7 | 8.9 |
| 24 hrs | 37.7 | 10.1 |
| 32 hrs | 42.2 | 10.5 |
| 40 hrs | 53.4 | 10.7 |
| GAS FADE (exposed to the combustion gas of a bunsen burner flame in a sealed chamber) | | |
| 8 hrs | 5.9 | 4.7 |
| 16 hrs | 7.4 | 5.7 |
| 24 hrs | 9.8 | 6.7 |
| 32 hrs | 10.2 | 6.4 |
| 40 hrs | 11.7 | 8.7 |

The latex binder in accordance with the present invention was subjected to various conditions and measured for Yellow Index on a Hunterlab Colorimeter. Light resistance was evaluated with the use of a carbon-arc fade-o-meter, heat aging was carried out in a forced air oven at 200° F. and gas fade was exposed to the combustion products of a bunsen burner with a squirrel cage holder. As shown by the Yellowing Index values provided in Table 8, the latex binder including an anti-oxidant exhibited enhanced resistance to heat, light, and gas exposure. It is believed that a nonwoven fabric having a latex binder including an anti-oxidant will also provide enhanced resistance to heat, light, and gas exposure and more durable fabric applications than experienced in the past with heretofore known styrene/butadiene type latices which were generally restricted to disposable applications because of their tendency to discolor and embrittle upon exposure to long periods of heat, light and gas.

Having described presently preferred embodiments of the invention, it is to be understood that it may be otherwise embodied within the scope of the appended claims.

What is claimed is:

1. A method of chemically bonding a preformed web of randomly arranged non-cellulose fibers to form a dimensionally stable non-woven fabric, wherein said method comprises applying to said preformed web of randomly arranged non-cellulose fibers an essentially formaldehyde free latex binder prepared by emulsion polymerization of an emulsion polymerizable mixture comprising ethylenically unsaturated monomers including at least one conjugated diene monomer and at least one vinyl substituted aromatic monomer, a polymeric surfactant in an amount of from about 10 to about 50 wt % and a chain transfer agent in an amount of from about 0.1 to about 2 wt %, wherein said latex binder has a gel content of less than about 10 wt %.

2. The method of claim 1 wherein said ethylenically unsaturated monomers consist essentially of about 90 to about 30 wt % conjugated diene monomer and about 10 to about 70 wt % vinyl substituted aromatic monomer.

3. The method of claim 1 wherein said method further comprises the step of heat treating the latex binder to a temperature of no more than about 225 degrees fahrenheit to chemically bond said preformed web of non-cellulose fibers to form a dimensionally stable nonwoven fabric.

4. The method of claim 3 wherein the polymeric surfactant has a weight average molecular weight greater than about 7,000 and the latex binder has a gel content of less than about 10 wt %.

5. The method of claim 3 wherein the latex binder includes an anti-oxidant for enhanced resistance to heat, light and gas exposure.

6. The method of claim 3 wherein the latex binder includes an anti-oxidant comprising an aqueous mixture of ditridecyl thiodipropionate, 4-methyl phenol and a reaction product of dicyclopentadiene and isobutylene, sodium dodecylbenzene sulfonate.

7. A nonwoven fabric of a chemically bonded preformed web of non-cellulose fibers comprising:
   a random arrangement of non-cellulose fibers; and
   an essentially formaldehyde free latex binder prepared by emulsion polymerization of an emulsion polymerizable mixture comprising ethylenically unsaturated monomers, a polymeric surfactant in an amount of from about 10 to about 50 wt % and a chain transfer agent in an amount of from about 0.1 to about 2 wt %, said ethylenically unsaturated monomers consisting essentially of about 90 to about 30 wt % conjugated diene monomer and about 10 to about 70 wt % vinyl substituted aromatic monomer;
   said latex binder having a gel content of less than about 10 wt % and capable of developing maximum tensile properties at temperatures of no more than about 225 degrees fahrenheit to chemically bond said preformed web of non-cellulose fibers and form a dimensionally stable non-woven fabric.

8. The nonwoven fabric of claim 7 wherein said latex binder is capable of developing maximum tensile properties at temperatures between about 200 to about 225 degrees fahrenheit.

9. The nonwoven fabric of claim 8 wherein said non-cellulose fibers are glass fibers, fibers from high polymers or high modulus polymers.

10. The nonwoven fabric of claim 9 wherein said high polymers are polyolefins, polyesters, acrylics or polyamides.

11. The nonwoven fabric of claim 10 wherein said polyolefins are polypropylene, polyethylene, polybutene and their copolymers.

12. The nonwoven fabric of claim 10 wherein said polyesters are polyethylene terephthalate or liquid crystal polyesters.

13. The nonwoven fabric of claim 10 wherein said acrylics include a fiber forming substance containing a long chain synthetic polymer composed of at least about 85 wt % acrylonitrile units.

14. The nonwoven fabric of claim 9 wherein said high modulus polymer fibers are graphite fibers, polyacrylonitrile or petroleum pitch.

15. The nonwoven fabric of claim 7 wherein said latex binder has a gel content of less than about 10 wt %.

16. The nonwoven fabric of claim 15 wherein said polymeric surfactant has a weight average molecular weight greater than about 7,000 and an acid value between about 100 to about 300.

17. The nonwoven fabric of claim 7 wherein said latex binder includes an anti-oxidant for enhanced resistance to heat, light and gas exposure.

18. The nonwoven fabric of claim 7 wherein said latex binder includes an anti-oxidant comprising an aqueous mixture of ditridecyl thiodipropionate, 4-methyl phenol, sodium dodecylbenzene sulfonate and a reaction product of dicyclopentadiene and isobutylene.

19. An essentially formaldehyde freelatex binder for chemically bonding a preformed web of noncellulose fibers to form a dimensionally stable nonwoven fabric, said latex binder prepared by emulsion polymerization of an emulsion polymerizable mixture comprising ethylenically unsaturated monomers, a polymeric surfactant in an amount of from about 10 to about 50 wt % and a chain transfer agent in an amount of from about 0.1 to about 2 wt %, said ethylenically unsaturated monomers consisting essentially of about 90 to about 30 wt % conjugated diene monomer and about 10 to about 70 wt % vinyl substituted aromatic monomer, wherein said latex binder has a gel content of less than about 10 wt % and is capable of developing maximum tensile properties in said nonwoven fabric at temperatures no more than about 225 degrees fahrenheit.

20. The latex binder of claim 19 wherein said polymeric surfactant has a weight average molecular weight greater than about 7,000 and an acid value between about 100 to about 300.

21. The latex binder of claim 19 wherein said conjugated diene monomer is from about 45 to about 75 wt %.

22. The latex binder of claim 21 wherein said conjugated diene monomers is selected from the group consisting of piperylene, isoprene, 2,3-dimethyl-1,3-butadiene, and butadiene.

23. The latex binder of claim 20 wherein said vinyl substituted aromatic monomer is from about 25 to about 55 wt %.

24. The latex binder of claim 23 wherein said vinyl substituted aromatic monomer is selected from the group consisting of α-methyl styrene, p-tertiary butyl styrene, m-vinyl toluene, p-vinyl toluene, 3-ethyl styrene, and styrene.

25. The latex binder of claim 20 wherein said polymeric surfactant is a resin containing about 25 to about 27 wt % styrene/acrylic acid/α-methyl styrene copolymer in water neutralized with a base.

26. The latex binder of claim 25 wherein said base is ammonium hydroxide.

27. The latex binder of claim 20 wherein said polymeric surfactant has an acid value of about 205 and a weight average molecular weight of about 8,500.

28. The latex binder of claim 25 wherein said polymeric surfactant contains about 37:32:31 average weight ratio of monomers in parts by weight of α-methyl styrene, styrene and acrylic acid.

29. The latex binder of claim 20 wherein said chain transfer agent is selected from the group consisting of alkyl mercaptans, aryl mercaptans, tertiary alkyl mercaptans.

30. The latex binder of claim 20 wherein said chain transfer agent is selected from the group consisting of n-octyl mercaptan, n-dodecyl mercaptan, t-octyl mercaptan, t-dodecyl mercaptan, tridecyl mercaptan, tetradecyl mercaptan, hexadecyl mercaptan, and a mixture thereof.

31. The latex binder of claim 20 wherein said latex binder includes an anti-oxidant for enhanced resistance to heat, light and gas exposure.

32. The latex binder of claim 20 wherein said latex binder includes an anti-oxidant comprising an aqueous mixture of ditridecyl thiodipropionate, 4-methyl phenol, sodium dodecylbenzene sulfonate and a reaction product of dicyclopentadiene and isobutylene.

* * * * *